I. ROGERS.
APPLE CORERS.
No. 182,133. Patented Sept. 12, 1876.
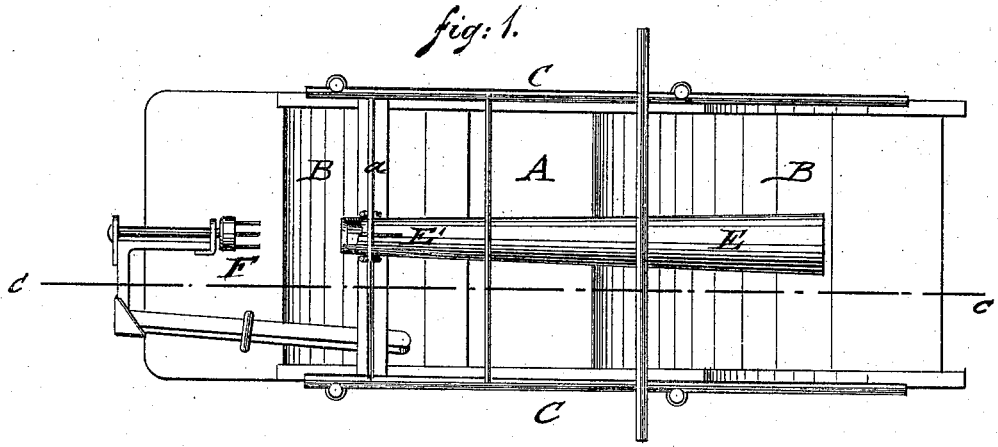
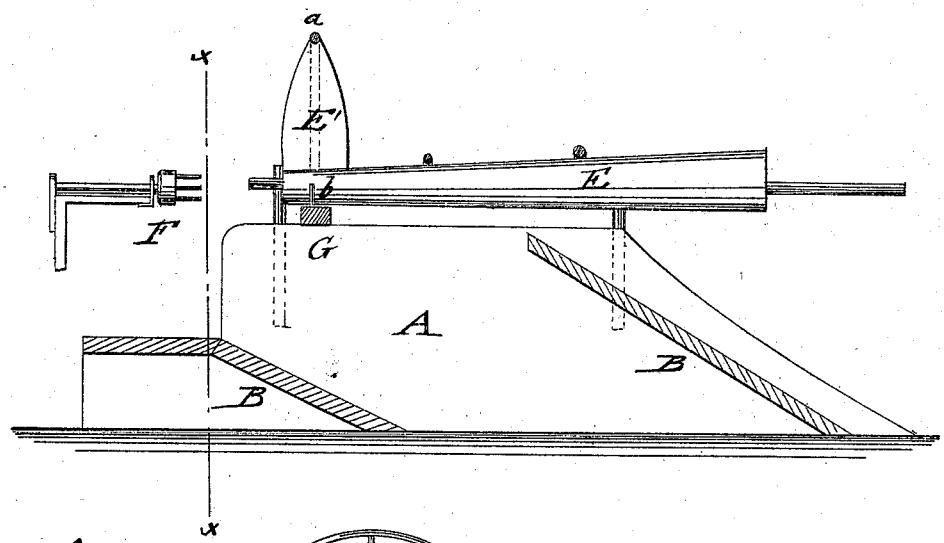
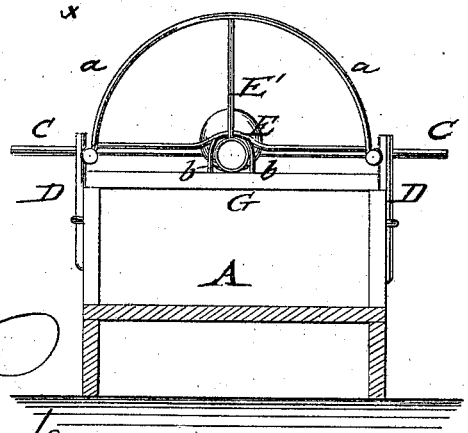
WITNESSES:
Chas. Nida.
Alex F. Roberts
INVENTOR:
Isaac Rogers
BY
ATTORNEYS.

UNITED STATES PATENT OFFICE.

ISAAC ROGERS, OF SHERIDAN, OREGON.

IMPROVEMENT IN APPLE-CORERS.

Specification forming part of Letters Patent No. 182,133, dated September 12, 1876; application filed November 27, 1875.

*To all whom it may concern:*

Be it known that I, ISAAC ROGERS, of Sheridan, Yam Hill county, Oregon, have invented a new and Improved Apple-Corer, of which the following is a specification:

Figure 1 represents a top view of my improved apple-corer; Fig. 2, a vertical longitudinal section on the line $c\ c$, Fig. 1; and Fig. 3, a vertical transverse section of the same on line $x\ x$, Fig. 2.

Similar letters of reference indicate corresponding parts.

My invention has for its object to furnish an improved machine, that is so constructed that apples and pears may be cored and separated, after having been pared and sliced, by one operation, requiring only one handling of the fruit, and accomplishing the work in a quick and satisfactory manner.

The invention consists in combining with a fork, coring-tube, and cutter, a cross-piece having top pins, whereby the pared and sliced apple is automatically removed, as hereinafter described.

In the drawing, A represents a casing or frame, that is arranged in suitable connection with the apple-parer, the paring-fork F being applied in adjustable manner at the end of the case. The case A is made with inclined sides B, that extend in downward direction from the paring-fork, to convey the cored fruit to a suitable receptacle below the case. A core-tube supporting-frame, C, slides on suitable guide-posts D, attached to the side of the casing, and is operated by hand or treadle power. A coring-tube, E, of tapering shape, is arranged on frame C in line with the axis of the paring-fork, and sharpened at the front end, to cut out the cores and allow them to pass freely through the widening tube after the tight or wedging portion of the same is passed. The wedging action of the front end secures a firm hold of the core, and pulls it off the fork. A sharp blade, E', is applied vertically above the end of the core-tube, and held securely in the end of a semicircular stiffening wire or rim, $a$, that is attached at both sides of the sliding frame C.

The blade E serves to divide the fruit simultaneously with the coring, by the forward motion of the sliding frame. The return motion of the sliding frame carries the cord and sliced fruit against a cross-piece, G, of frame A, with guard-pins $b$ at both sides of the cord-tube, which separates the cut fruit from the core and blade, and causes the same to drop on the inclined plane and fall into the receptacle.

The forward stroke of tube and blade cores and cuts the fruit, while the return-stroke carries the core back and drops the divided fruit so as to form a rapidly-operated and simple device for the purpose.

Having thus described my invention, I claim as new and desire to secure by Letters Patent—

The combination, with the fork F and bladed tube E E', of the cross-piece G, having pins $b$ arranged as and for the purpose specified.

The above specification of my invention signed by me October 23, 1875.

ISAAC ROGERS.

Witnesses:
C. G. ROWELL,
HENRY F. MAYER.